Figure 1:
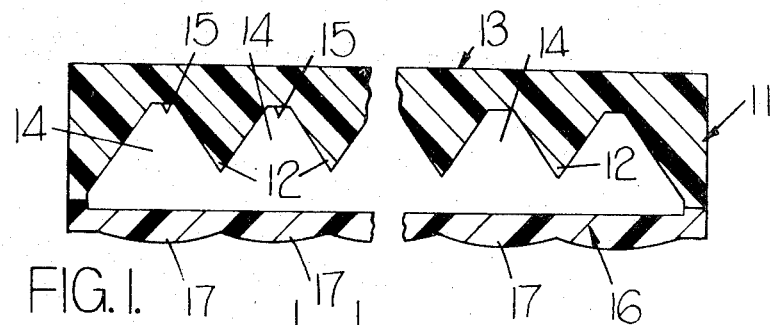

United States Patent [19]
Green

[11] 3,779,629
[45] Dec. 18, 1973

[54] COMBINED LENS AND REFLECTOR FOR A VEHICLE LAMP

[75] Inventor: Stanley Green, Warley, England

[73] Assignee: Joseph Lucas (Industries) Limited, Birmingham, England

[22] Filed: June 5, 1972

[21] Appl. No.: 259,820

[30] Foreign Application Priority Data
June 23, 1971 Great Britain .................. 29,403/71

[52] U.S. Cl. .............................. 350/103, 350/101
[51] Int. Cl. .......................................... G02b 5/12
[58] Field of Search .................... 350/97–109, 211

[56] References Cited
UNITED STATES PATENTS

| | | | |
|---|---|---|---|
| 3,632,695 | 1/1972 | Howell | 350/103 |
| 3,177,397 | 4/1965 | Keeran | 350/211 |
| 3,532,871 | 10/1970 | Shipman | 350/103 |
| 1,874,138 | 8/1932 | Stimson | 350/103 |

FOREIGN PATENTS OR APPLICATIONS

| | | | |
|---|---|---|---|
| 956,566 | 7/1956 | Germany | 350/101 |

Primary Examiner—David Schonberg
Assistant Examiner—Michael J. Tokar
Attorney—Holman & Stern

[57] ABSTRACT

A combined lens and reflex reflector for a vehicle lamp in particular a vehicle tail lamp. The combination includes a first transparent component having integral with one face thereof a plurality of corner cube reflectors. Between the corner cube reflectors are defined a plurality of recesses, and the base of each recess is generally parallel with the adjacent portion of the opposite surface of the component. The corner cube reflectors reflect light incident upon the first component from one direction, back towards its source. The combination includes a second transparent component which defines a plurality of converging lenses, and which is positioned so that light incident on the second component from a direction opposite said one direction is directed by the lenses onto the base regions of the recesses of the first component so that the light is transmitted by the first component.

7 Claims, 4 Drawing Figures

COMBINED LENS AND REFLECTOR FOR A VEHICLE LAMP

This invention relates to a combined lens and reflex reflector for a vehicle lamp particularly a vehicle tail lamp.

A combined lens and reflex reflector according to the invention includes a first transparent component including a plurality of integral corner cube reflectors integral with one surface of the component and defining between them a plurality of recesses, said corner cube reflectors reflecting light incident upon the first component from one direction back towards its source and said recesses being formed with base regions generally parallel with the adjacent portions of the opposite surface of the component, and the combined lens and reflector further including a second transparent component defining a plurality of converging lenses and being positioned in use, so that light incident on the second component from a direction opposite said one direction is directed by said lenses onto said base regions of the recesses in the first component so that the light is transmitted by the first component.

Conveniently said base regions of the recesses are flat, but alternatively the base regions can be curved so that the adjacent regions of the first component also act as lenses.

Preferably the first and second components are secured together so as to constitute a single unit.

Desirably both components are moulded in a synthetic resin material and the first component is coloured to suit the application of the lamp utilizing the combined lens and reflex reflector.

Figure 2:
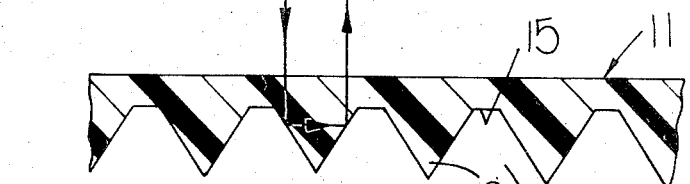
Figure 3:
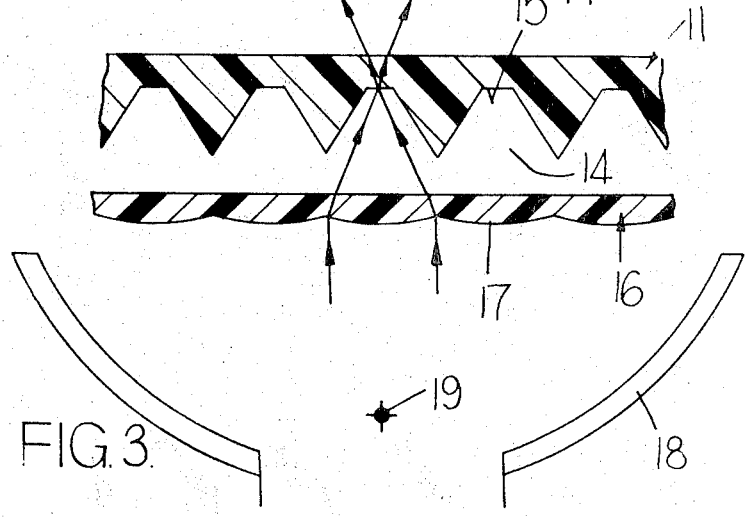
Figure 4:
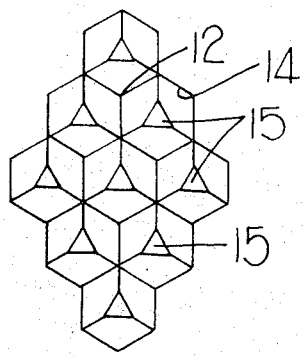

One example of the invention is illustrated in the accompanying drawing wherein:

FIG. 1 is a fragmentary diagrammatic representation of a combined lens and reflector for a vehicle lamp, FIG. 2 is a sectional view of part of the combined lens and reflector shown in FIG. 1, illustrating the reflective properties thereof, FIG. 3 is a view similar to FIG. 1 illustrating the transmissive properties of the combined lens and reflector, and FIG. 4 is a fragmentary view on the direction of arrow A of component shown in FIG. 2.

Referring to the drawings, the combined lens and reflector includes a first component 11 which is moulded in transparent synthetic resin material and which defines a plurality of corner cube reflectors 12. The component 11 has a plane outer surface 13, the corner cube reflectors 12 projecting from the opposite surface of the component 11, and defining between them pyramidal recesses 14. Each recess 14 is formed with a flat base 15 generally parallel with the surface 13 of the component 11.

The combined lens and reflector further includes a second component 16 also moulded in transparent synthetic resin material. The component 16 is secured to the component 11 and an air space is defined between the components 11 and 16. The component 16 is shaped to define a plurality of converging lenses 17, and the arrangement of the component 16 with respect to the component 11 is such that the optical axis of each lens 17 is co-extensive with the axis of a respective recess 14.

In use the combined lens and reflector is secured to a lamp body illustrated diagrammatically at 18 in FIG. 3. Light from the light source 19 of the lamp is reflected by the parabolic reflector (not shown) of the lamp and is incident upon the outer surface of the component 16. The individual converging lenses 17 of the component 16 direct the light incident upon the component 16 into the recesses 14 of the component 11, and onto the base regions 15 of the recesses 14. The light incident upon the flat base regions 15 of the recesses 14 is transmitted by the component 11 so that when the light source 19 of the lamp is energised light issues from the combined lens and reflector of the lamp so that the lamp is visible. It will be appreciated that without the provision of the surfaces 15 and the component 16, light from the source 19 would be scattered by the component 11.

Light impinging on the surface 13 of the component 11, from the exterior of the lamp, enters the component 11 and is reflected by the corner-cube reflectors 12 back towards its source. Thus with respect to light from the exterior of the lamp the combined lens and reflector acts as a reflex reflector, while acting as a lens with respect to light from inside the lamp.

The combined lens and reflector described above is particularly suitable for use as the cover of a vehicle tail lamp, in which case the component 11 will be coloured to suit the lighting regulations of the particular country in which the vehicle is to be driven. Moreover, it will be appreciated that if desired the combined lens and reflector can be curved rather than planar, and in such an arrangement the base regions 15 of the recesses 14 are maintained as near as possible parallel with the adjacent regions of the outer surface of the component 11. The components 11 and 16 are secured together in such a manner that the air space between them is sealed thereby preventing dust and moisture collecting on the shaped surface of the component 11.

In a modification the bases 15 of the recesses 14 are part spherical rather than flat and so the regions of the component 11 adjacent the bases 15 also act as lenses.

It is preferable that the component 16 is arranged with the curved lens surfaces outermost, that is to say presented to the light source of the lamp.

In a further modification the combined lens and reflector is for use with a lamp without a parabolic reflector. In order to ensure that the light falling on the lenses 17 is parallel light, the face of the component 16 presented to the light source of the lens is shaped to define a fresnel lens the focal length of which is chosen in relation to the intended spacing of the lens from the light source of the lamp so that substantially parallel light is focussed by the lenses 17. In this modification the curved surfaces of the lenses 17 will of course be presented to the air gap between the components 11, 16.

I claim:

1. A combined lens and reflex reflector including a first transparent component comprising a plurality of identical corner cube prisms integral with one surface of the component and defining reflex reflectors, said prisms being identically angularly orientated and positioned with respect to one another such that defined between the prisms, by the faces of the prisms are a plurality of identical corner cube recesses, the corner cube recesses being truncated so that each recess has a base region generally parallel with the adjacent portion of the opposite surface of the component, said corner cube prisms being capable of reflecting light incident upon said opposite surface of the first component back towards its source, and the combined lens and reflector further including a second transparent component, a plurality of converging lenses defined by said second transparent component and so positioned that, in use, light incident upon the second component in a direction towards the first component is directed by said lenses onto said base regions of the recesses of the first component so that the light is transmitted by the first component.

2. A combined lens and reflex reflector as claimed in claim 1 wherein the base regions of said recesses are flat.

3. A combined lens and reflex reflector as claimed in claim 1 wherein the base regions of said recesses are curved so that the adjacent portions of the component act as lenses.

4. A combined lens and reflex reflector as claimed in claim 1 wherein the first and second components are secured together so as to constitute a single unit.

5. A combined lens and reflex reflector as claimed in claim 4 wherein a sealed air space is defined between the first and second components.

6. A combined lens and reflex reflector as claimed in claim 1 wherein both components are moulded in synthetic resin material and the first component is coloured to suit the application of the lamp utilizing the combined lens and reflex reflector.

7. A combined lens and reflex reflector as claimed in claim 1 wherein the surface of the second component which, in use, is presented to the light source of a fresnel lens to ensure that the light falling on the converging lenses of the second component is parallel light.

* * * * *